United States Patent

Gilliam, III et al.

[11] Patent Number: 4,649,593
[45] Date of Patent: Mar. 17, 1987

[54] WINDSHIELD WIPER AND CLEANER

[76] Inventors: Julius C. Gilliam, III, 724 Madeira Ave., Coral Gables, Fla. 33134; Richard D. Morse, 601 N. 64th Ter., Hollywood, Fla. 33024

[21] Appl. No.: 765,543

[22] Filed: Aug. 14, 1985

[51] Int. Cl.$^4$ ............................................. B60S 1/38
[52] U.S. Cl. ............................ 15/250.41; 15/250.03; 15/250.36
[58] Field of Search ........... 15/250.03, 250.41, 250.42, 15/250.36

[56] References Cited

U.S. PATENT DOCUMENTS

| 1,816,370 | 7/1931 | Hachenberg | 15/250.41 |
| 2,027,971 | 1/1936 | Godown | 15/250.03 |
| 2,583,710 | 1/1952 | Scinta | 15/250.36 |
| 3,638,274 | 2/1972 | Farver | 15/250.41 |
| 3,906,583 | 9/1975 | Murphy | 15/250.03 |
| 4,327,457 | 5/1982 | Lunsford | 15/250.41 X |

FOREIGN PATENT DOCUMENTS

| 2700527 | 9/1978 | Fed. Rep. of Germany | 15/250.41 |
| 8302756 | 8/1983 | PCT Int'l Appl. | 15/250.41 |

Primary Examiner—Peter Feldman
Attorney, Agent, or Firm—Alvin S. Blum

[57] ABSTRACT

A combined windshield wiping and cleaning device has a scrubbing member with a reticular surface for removing solid matter along with a wiper member for squeegee removal of water. These are formed together with a supporting base as a single monolithic extrusion of an elastomeric material. It fits into the windshield wiper arm in the same way as current blades which only wipe.

17 Claims, 4 Drawing Figures

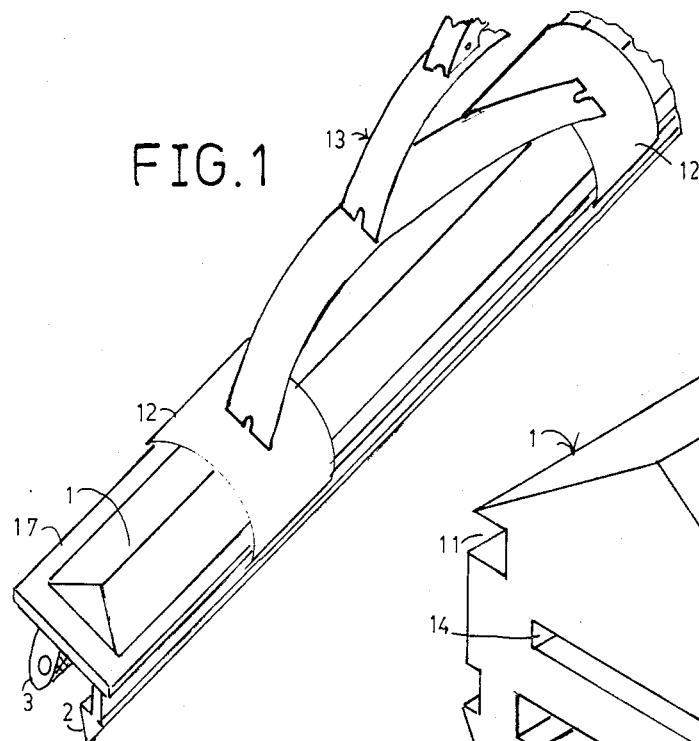
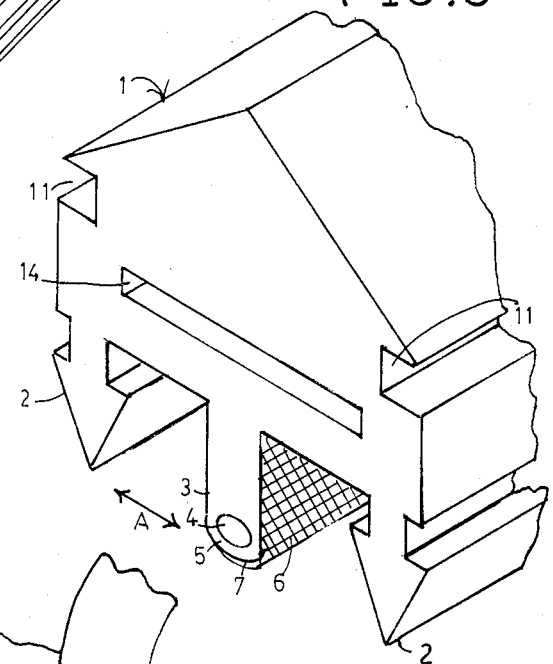
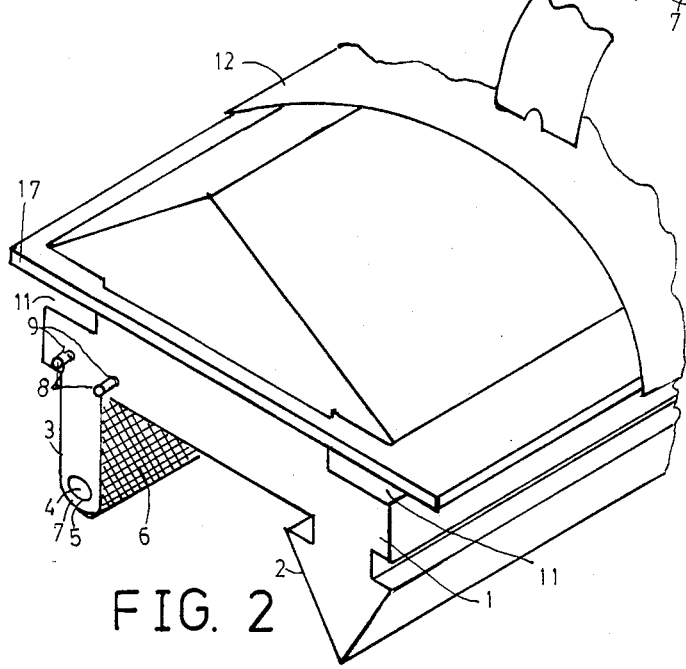
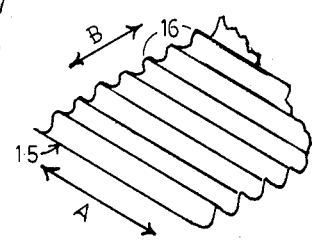

WINDSHIELD WIPER AND CLEANER

BACKGROUND OF THE INVENTION

This invention relates to a unitary device combining the two separate functions of cleaning solids from vehicular windshields and wiping water from windshields.

It is well known that windshield wipers are effective for removing water, but that they are relatively ineffective for removing solids such as insect remains because their squeegee action tends to smear the solids into a thin film by forcing it against the glass surface. Consequently, the driver may be forced to halt to scrub off the solid matter manually or drive with obscured visibility.

SUMMARY OF THE INVENTION

It is accordingly a primary object of the invention to provide a device for vehicular windshields which combines the function of cleaning and scrubbing solid matter with the function of wiping and squeegee removal of water in a single element.

It is a further object that the invention may be conveniently installed and operated in the standard wiper arm assembly now commonly used to perform only the wiping or squeegee removal of water on windshields.

It is a further object to provide an economically fabricated device that is inexpensive to procure and easy to install in a manner similar to the installation of standard windshield wiper blades.

It is a further object of the invention to provide at least one scrubbing member comprising a generally tubular, elongate hollow or solid member covered with a mesh or net for the scrubbing function parallel to at least one elongate wiper member of generally conventional design for the wiper function supported by a common base along the entire length of each member, wherein the base is adapted to be held in place and operated by a windshield wiper arm assembly which may be of conventional design.

It is a further object of the invention that the scrubbing member(s) and wiping member(s) and common base be adapted so as to be extrudable in a single common profile extrusion from a suitable elastomeric material, exclusive of the mesh or net covering.

Other objects, features and advantages of the present invention will become apparent from the following detailed descriptions of preferred embodiments in conjunction with the drawings.

BRIEF DESCRIPTION OF THE DRAWINGS

FIG. 1 is a partial perspective view of a windshield wiper arm assembly with a combined wiping and cleaning device in place in accordance with the teachings of the present invention.

FIG. 2 is a partial perspective view of an embodiment of the invention incorporating a spline method of holding the mesh in place.

FIG. 3 is a partial perspective of an another embodiment of the invention with a wiper member on either side of a scrubbing member.

FIG. 4 is a partial perspective of a stiffening strip for insertion into the slot of FIG. 3.

DETAILED DESCRIPTION OF THE PREFERRED EMBODIMENTS

The combined windshield cleaning and wiping device of the present invention is a one-piece elastomeric profile extrusion 1, as shown in FIG. 2 comprising a wiping blade member 2 generally of the tapered configuration usually employed for the water wiping and squeegeeing function and also a tubular member 3 having a longitudinal hole 4 therethrough providing a yieldable thin wall 5 to permit said wall to deform to a flat surface in contact with the windshield to provide a greater contact surface area for improved cleaning and scrubbing function. A mesh or net 6, as exemplified by a nylon netting covers the surface 7 of member 3. The reticular surface provided by mesh 6 on flattened surface 7 of tubular member 3 greatly enhances the scrubbing action necessary to scrape solids such as insect remains from the glass without scratching. The mesh 6 may be secured to the surface of member 3 by a variety of securing means. The surface of member 3 is impermeable to moisture. Illustrated in FIG. 2 is a pair of elongate splines 8 pressing the edges of mesh 6 into recesses 9.

Alternatively, the mesh 6 may be secured by staples, heat sealing, adhesives and the like. The wiping blade member 2 and scrubbing member 3 are formed parallel to each other and spaced sufficiently apart to permit each member to flex and bend under the motion of crossing the windshield without interfering with each other. The members 2 and 3 are supported by base 10. Base 10 is provided with generally coplanar slots 11 along its sides. The base 10 and slots 11 are shaped to fit into the stiff support strip 17 which is held by the clip 12 of the windshield wiper arm assembly 13 shown in FIG. 1. The base 10 and slots 11 may be made in whatever configuration is required to be secured in a particular wiper arm assembly. The wiper arm assembly 13 with the combined device 1 of the present invention in place will operate in the same manner as a conventional windshield wiper in removing water from the surface with member 2. In addition, when insects and other solids are deposited on the windshield, they will be scrubbed off by the reticular surface of member 3.

In an alternative embodiment of the invention illustrated in FIG. 3, a tubular scrubbing element 3 is supported centrally on base 10 with a pair of wiping blade members 2 arranged one on each side of the scrubbing member 3. This embodiment leaves the glass dry on each stroke of the blade. A slot 14 is formed in the base 10. Into this slot is inserted the corrugated stiffening strip 15 of FIG. 4. The elongate strip 15 is composed of a stiffer material as exemplified by thin stainless steel. The transverse corrugations 16 inhibit transverse flexing of the base 10 (in direction A) so that the three member's positions relative to one another do not change under the forces created by motion against the glass. The transverse corrugations further provide greater flexibility in the longitudinal direction B to permit the blade to conform more closely to the curved shape of certain windshields.

The invention may be made by extruding an elastomer of the composition currently employed for windshield wiper blades in the profiles exemplified by FIG. 2 or 3. The tubular element is then covered with nylon mesh. The extrusion is then cut into appropriate lengths for use. If a stiffening strip is required, it is inserted into the slot provided. The cut device may be marketed in this form for refilling of wiper arms. Alternatively, the device may be installed in a wiper arm assembly and marketed in that form.

We claim:

1. A combination windshield cleaning and wiping device adapted for connection to a windshield wiper arm assembly for both cleaning solids from a windshield and wiping water from said windshield comprising:
   a base means adapted for connection to said windshield wiper arm assembly;
   at least one elongate cleaning member means supported by and directly connected along its length to said base means, said cleaning member means having a generally tubular configuration with a yieldable wall opposite said base means, said yieldable wall adapted for deforming when forced against said windshield to present an increased cleaning surface to said windshield, said cleaning surface having a mesh surface configuration with an impermeable subsurface for enhanced scrubbing action for solids removal;
   at least one elongate wiper member means generally parallel to said cleaning member means and supported by and directly connected along its length to said base means, said wiper member means having a generally tapering edge opposite said base means, said edge adapted for flexing when forced against said windshield for enhanced wiper and squeegee action for water removal, said wiper means and said cleaning member means being spaced from each other and movably independant of each other.

2. The device of claim 1, wherein said mesh surface of said cleaning member means is formed by a mesh covering.

3. The device of claim 2, wherein said mesh covering is a net made of thermoplastic material from the group consisting of nylon, polyolefin and polyurethane.

4. The device of claim 2, wherein said mesh covering is held in place by spline means fitting into recesses.

5. The device of claim 2, wherein said mesh covering is held in place by adhesive means.

6. The device of claim 2, wherein said mesh covering is held in place by staples means.

7. The device of claim 2, wherein said mesh covering is held in place by heat sealing means.

8. In the device of claim 1, said base means includes lateral slot means adapted for connection to a support means, said support means adapted for connection to said windshield wiper arm assembly.

9. The invention of claim 1, including lateral slot means in said base means and support means in said slot means, said support means adapted for connection to said windshield wiper arm assembly.

10. The device of claim 1, said base means including internal slot means adapted for holding stiffening member means.

11. The device of claim 10, including stiffening member means in said internal slot means.

12. The device of claim 11, wherein said stiffening member means is a corrugated strip for providing improved transverse stiffness without substantially increasing longitudinal stiffness.

13. The invention of claim 1, wherein said cleaning member means has at least one longitudinal hole therethrough.

14. The device of claim 1, wherein said base means, said cleaning member means, and said wiper means are comprised of a single elastomeric thermoplastic profile extrusion.

15. The device of claim 14, wherein said elastomeric thermoplastic is selected from a group consisting of butadiene, acrylonitrile, polyisobutylene, chloroprene, fluoroelastomer, polysiloxane, butadiene-styrene, and chlorosulfonated polyethylene.

16. The device of claim 1 including one said cleaning member means positioned between two said wiper member means.

17. The device of claim 1, including one cleaning member means and one wiper member means.

* * * * *